(12) United States Patent
Chang et al.

(10) Patent No.: US 8,672,076 B2
(45) Date of Patent: *Mar. 18, 2014

(54) MOTORCYCLE REAR-WHEELS TRANSMISSION AND SUSPENSION SYSTEM

(76) Inventors: Liang Chang, Ontario (CA); Xin Hua Chen, Huzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,301

(22) Filed: Apr. 9, 2012

(65) Prior Publication Data

US 2012/0193161 A1 Aug. 2, 2012

Related U.S. Application Data

(63) Continuation of application No. 12/455,260, filed on May 28, 2009, now Pat. No. 8,177,013.

(51) Int. Cl.
*B62D 61/06* (2006.01)

(52) U.S. Cl.
USPC .......................................... 180/215; 180/210

(58) Field of Classification Search
USPC .......... 180/215, 210, 908, 287; 280/781, 788, 280/304.2, 282
See application file for complete search history.

(56) References Cited

U.S. PATENT DOCUMENTS

| 4,058,181 | A | * | 11/1977 | Buell | 180/227 |
| 4,325,449 | A | * | 4/1982 | D'Addio et al. | 180/217 |
| 4,392,536 | A | * | 7/1983 | Iwai et al. | 180/217 |
| 4,463,964 | A | * | 8/1984 | Takayanagi et al. | 280/284 |
| 4,582,157 | A | * | 4/1986 | Watanabe | 180/215 |
| 5,611,555 | A | * | 3/1997 | Vidal | 280/282 |
| 6,286,619 | B1 | * | 9/2001 | Uchiyama et al. | 180/337 |
| 6,964,314 | B1 | * | 11/2005 | Vey | 180/209 |
| 8,066,089 | B2 | * | 11/2011 | Murad | 180/206.5 |
| 2001/0048207 | A1 | * | 12/2001 | Handa | 280/124.135 |
| 2003/0121711 | A1 | * | 7/2003 | Chiu | 180/312 |

* cited by examiner

*Primary Examiner* — Tashiana Adams
(74) *Attorney, Agent, or Firm* — Raymond Y. Chan; David and Raymond Patent Firm

(57) ABSTRACT

A rear-wheels transmission and suspension system, adapted for modifying a two wheeled motorcycle into a motorcycle containing two rear wheels, includes a suspension device, a rear axle and a transmission device. The suspension device includes a supporting frame longitudinally extending along the central axis of a construction frame and pivotally connected with a seat portion of the construction frame of the motorcycle for supporting the rear axle at the rear end the supporting frame while defining a transmission cavity after a rear end of the supporting frame and at a central position behind an output of said engine along the central axis of the construction frame. Therefore the transmission device is able to be supported by the rear axle in the transmission cavity to transmit a rotation output from the engine to drive the rear axle to rotate for driving the rear wheels to rotate.

20 Claims, 5 Drawing Sheets

100
MOTORCYCLE REAR-WHEELS TRANSMISSION AND SUSPENSION SYSTEM

CROSS REFERENCE OF RELATED APPLICATION

This is a Continuation application that claims the benefit of priority under 35 U.S.C. §119 to a non-provisional application, application Ser. No. 12/455,260, filed May 28, 2009 now U.S. Pat. No. 8,177,013.

BACKGROUND OF THE PRESENT INVENTION

1. Field of Invention

The present invention relates to a motorcycle transmission and suspension system, and more particularly to a rear-wheels transmission and suspension system for motorcycle.

2. Description of Related Arts

Currently, there are three types of motorcycles: the most popular two-wheeled vehicle, also called motor bicycle; the three-wheeled vehicle, which is also known as motor tricycle; and the four-wheeled vehicle, which is frequently referred as all terrain vehicle (ATV).

Motor bicycle is a single track vehicle with a front wheel and a rear wheel generally. It is light weighted, flexible, and gas saving. That's why motor bicycle is very popular in both urban district and rural area. But the problem is two-wheeled vehicle is not stable, driving and parking it needs extra effort to keep balance. This makes people, especially senior person difficult to use.

Four-wheeled motorcycle, especially ATV is good in stability. It is suitable to be used in a wider variety of terrain. But the problem is the system of ATV is complex and heavy, and it also has to sacrifice the speed.

Three-wheeled motorcycle combines the merits of both two-wheeled and four-wheeled motorcycle. It is more stable, easy to ride, and is not expensive. Typically, a tricycle comprises a pair of rear wheels mounted on the opposite ends of a rear axle. While one of the problems for the tricycle is when the tricycle is making a turn at a curve, or driving on an uneven ground, the two rear wheels will bear unbalanced force. This requests the material of the suspension system to afford the force and not to deform which will increase the cost and weight of the suspension system.

The conventional suspension system of a tricycle comprises a swing arm carrying a bearing gear of the rear wheel axle. The rear wheel axle extends through the bearing gear transversely and has two rear wheels fixed at the two opposite ends thereof. Therefore the whole weight of the rear part of the vehicle is executed on the center point of the axle. Also, when the force executed on the two rear wheels are not even, the axle will afford twisting force. To bear these forces and not to be deformed, the axle needs to be strong and the length should be limited. While, the shorter the axle is, the less the stability is. The cost of the axle structure and the transmission and suspension system is relatively high.

SUMMARY OF THE PRESENT INVENTION

An object of the present invention is to modify a two-wheeled motorcycle into a motorcycle containing two rear wheels while keeping or minimizing the modification of the original transmission system of the motor bicycle such that the conventional motor bicycle can achieve the performance such as better stability like a motor tricycle.

Another object of the present invention is to provide a motorcycle rear-wheels transmission and suspension system which is convenient to modify from a two-wheeled motorcycle to save effort and reduce cost, wherein the modification needs to be as less as possible and the transmission and the suspension system should cooperate with each other to provide the optimized performance.

Another object of the present invention is to provide a motorcycle rear-wheels transmission and suspension system which structure is simple, reliable and durable.

Another object of the present invention is to provide a motorcycle rear-wheels transmission and suspension system which is constructed at a central position to minimize and simplify the construction thereof while providing stable weight balance and support of the motorcycle.

Another object of the present invention is to provide a reinforcing frame for the motorcycle rear-wheels transmission and suspension system so as to protect the transmission and suspension system and reinforcing the support of the two rear wheels.

Another object of the present invention is to enable the user or the manufacturer to modify a motor bicycle to contain two rear wheels with a motorcycle rear-wheels transmission and suspension system. In which the engine output of the motor bicycle can be directly connected to the motorcycle rear-wheels transmission device for driving the two rear wheels to rotate while well supporting the motorcycle rear-wheels transmission device and the two rear wheels with the rear-wheels suspension device and the original construction frame of the motor bicycle.

Additional advantages and features of the invention will become apparent from the description which follows, and may be realized by means of the instrumentalities and combinations particular point out in the appended claims.

In order to accomplish the above objects, the present invention provides a motorcycle rear-wheels transmission and suspension system for a motorcycle having a construction frame to mount and support an engine, one front wheel and two rear wheels, comprising:

a suspension device which comprises a supporting frame adapted for longitudinally extending along a central axis of the construction frame and pivotally connecting with a seat portion of the construction frame of the motorcycle; a suspension unit provided between the supporting frame and the construction frame for absorbing shock; and an axle supporter transversely provided at a rear end of the supporting frame, wherein a transmission cavity is defined after a rear end of the supporting frame and at a central position behind an output of the engine along the central axis of the construction frame;

a rear axle rotatably and transversely supported by the axle supporter for connecting with the two rear wheels at two outer ends thereof; and a transmission device supported by the rear axle in the transmission cavity of the suspension device to transmit a rotation output from the engine to drive the rear axle to rotate for driving the rear wheels to rotate.

In the preferred embodiment, the axle supporter comprises a pair of axle sleeves coaxially aligned and transversely affixed at a rear end of the supporting frame.

In the preferred embodiment, the present invention further comprises a reinforced frame crossing over the pair of axle sleeves to support and retain an alignment of the axle sleeves and define the transmission cavity between the pair of axle sleeves and the reinforced frame at the central position that is directly behind the engine output along the central axis of the motorcycle.

In the preferred embodiment, the transmission device is supported in the transmission cavity of the suspension device to transmit the rotation output from the engine of the motorcycle to drive a rear axle to rotate, wherein a left axle and a right axle of the rear axle are carried and extended transversely and rotatably through the pair of axle sleeves respectively for connecting with the two rear wheels and driving the two rear wheels to rotate.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
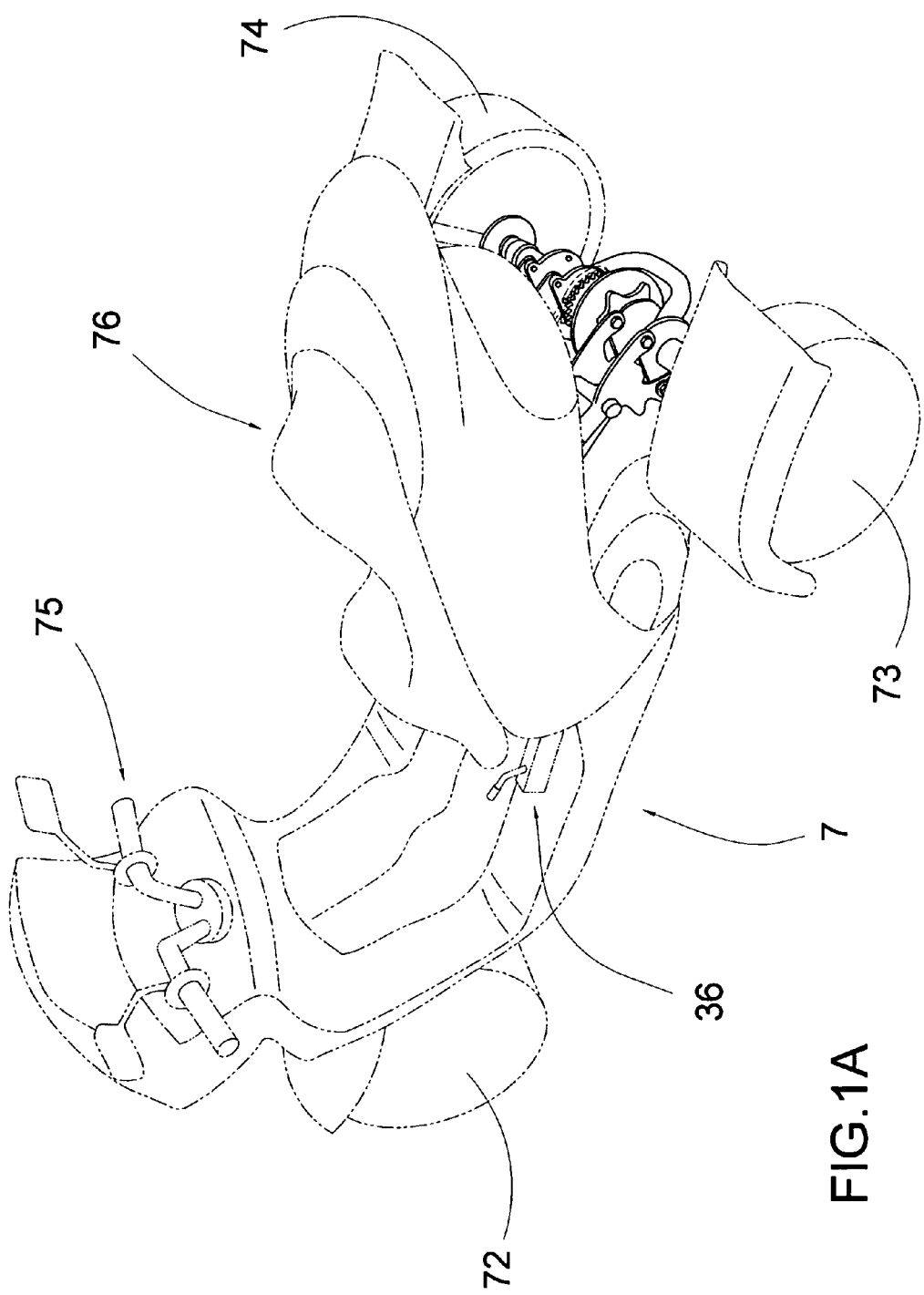
FIG. 1A is schematic view illustrating a motorcycle installed with a motorcycle rear-wheels transmission and suspension system of the present invention.
Figure 1B:
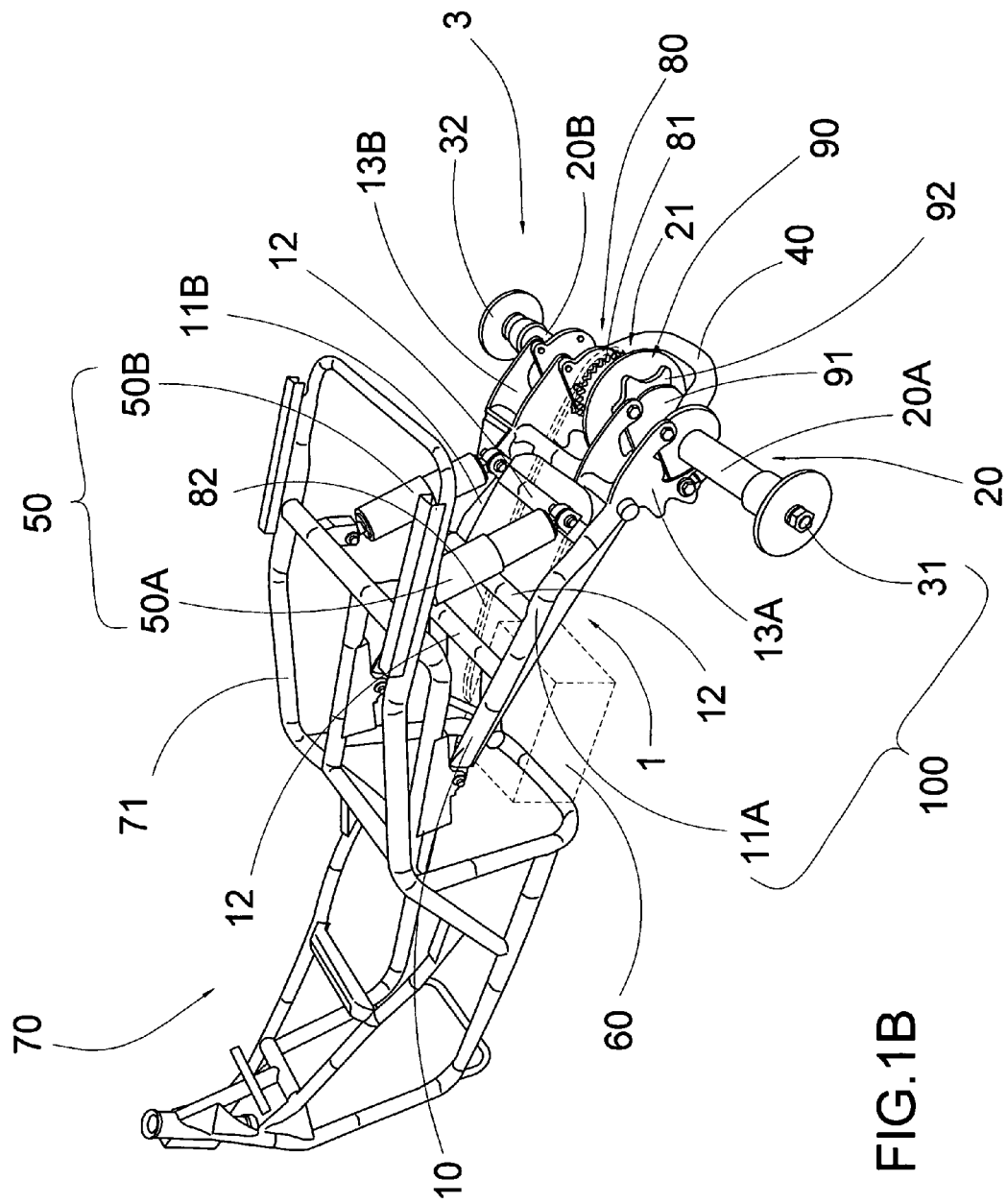
FIG. 1B is a perspective view of the motorcycle rear-wheels transmission and suspension system according to a preferred embodiment of the present invention.

Referring to FIGS. 1A and 1B of the drawings, according to a preferred embodiment of the present invention, the present invention provides a motorcycle rear-wheels transmission and suspension system 100 which is adapted to be installed in a motorcycle 7 to provide a two rear wheels construction. The motorcycle 7 comprises a construction frame 70 having a seat portion 71 to mount and support an engine 60, a front wheel 72, a left rear wheel 73, a right rear wheel 74, a steering system 75, and a seat 76.

The motorcycle rear-wheels transmission and suspension system 100 according to the preferred embodiment of the present invention comprises a rear suspension device 1, a rear axle 30 and a rear transmission device 3. The suspension device 1 comprises a supporting frame 10, a suspension unit 50, an axle supporter 20, and a reinforced frame 40. The transmission device 3 is supported by the axle supporter 20 to transmit the rotation output from the engine 60 to drive a rear axle 30 to rotate to drive the two rear wheels 73, 74.

The supporting frame 10 is longitudinally extended along a central axis of the construction frame 70 and pivotally connected with the seat portion 71 of the construction frame 70 of the motorcycle 7. The suspension unit 50 is provided between the supporting frame 10 and the construction frame 70 for absorbing shock.

The axle supporter 20 is transversely provided at a rear end of the supporting frame 10 and at a central position behind an output of the engine 60 along the central axis of the construction frame 70, wherein a transmission cavity 21 is defined after a rear end of the supporting frame 10 at a central position behind an output of the engine 60 along the central axis of the construction frame 70.

The rear axle 30 is rotatably and transversely supported by the axle supporter 20 for connecting with the two rear wheels 73, 74 at two outer ends thereof. The transmission device is supported by the rear axle 30 in the transmission cavity 21 of the suspension device 1 to transmit a rotation output from the engine 60 to drive the rear axle 30 for driving the rear wheels 73, 74 to rotate.

According to the preferred embodiment of the present invention, the axle supporter 20 comprises a pair of axle sleeves 20A, 20B coaxially aligned and transversely affixed at the rear end of the supporting frame 10. The suspension device 1 further comprises a reinforced frame 40 which is mounted across over the pair of axle sleeves 20A, 20B of the axle supporter 20 to support and retain an alignment of the axle sleeves 20A, 20B and define a transmission cavity 21 between the pair of axle sleeves 20A, 20B and the reinforced frame 40 at a central position that is directly behind the rotation output of engine 60 along the central axis of the motorcycle 7.

The transmission device 3 is supported in the transmission cavity 21 of the suspension device 1 to transmit the rotation output from the engine of the motorcycle to drive the rear axle 30 to rotate, wherein a left axle 31 and a right axle 32 of the rear axle 30 are carried and extended transversely and rotatably through the pair of axle sleeves 20A, 20B respectively for connecting with the two rear wheels 73, 74 and driving the two rear wheels 73, 74 to rotate.

Figure 2:
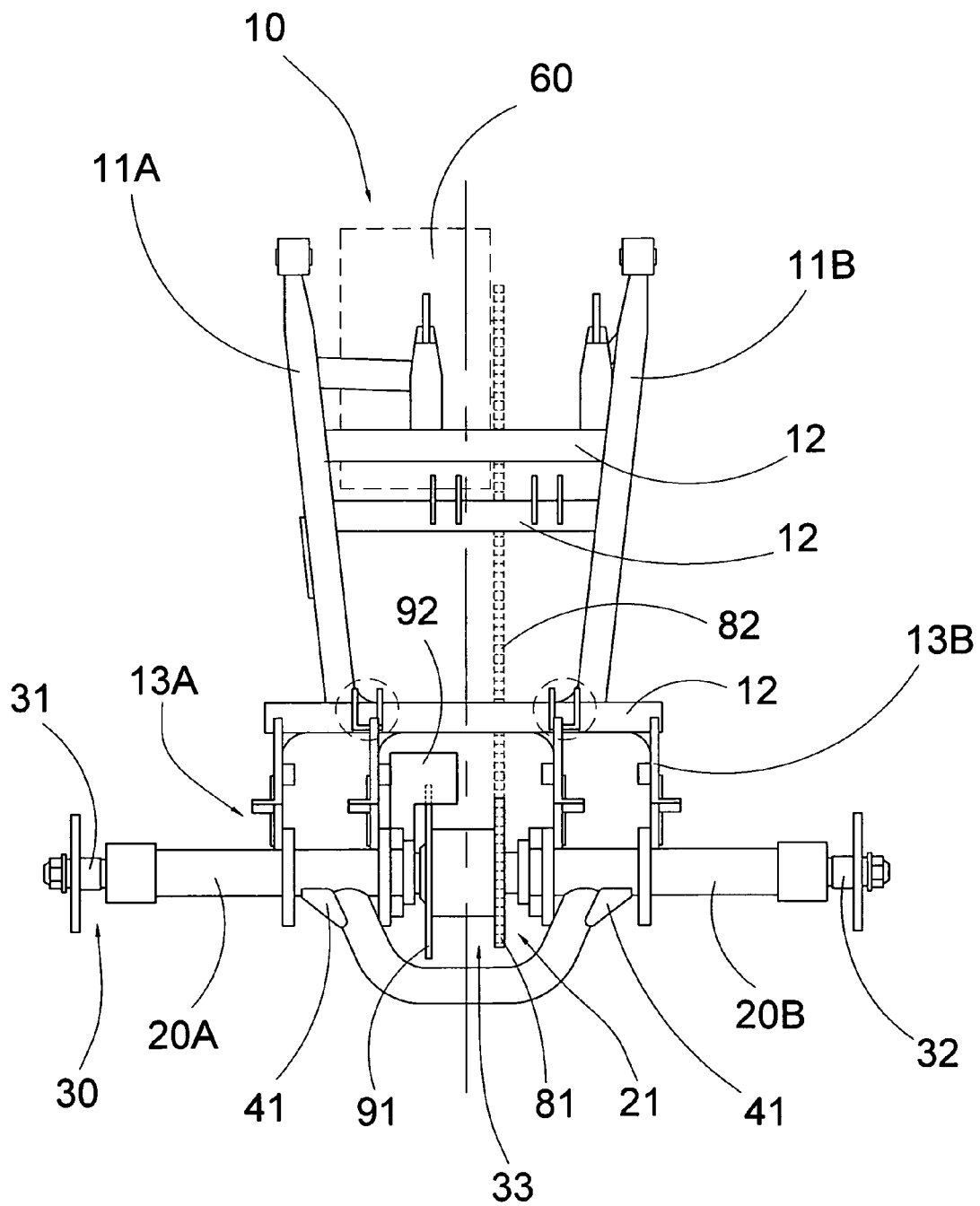
FIG. 2 is a top view of the motorcycle rear-wheels transmission and suspension system according to the above preferred embodiment of the present invention.
Figure 4:
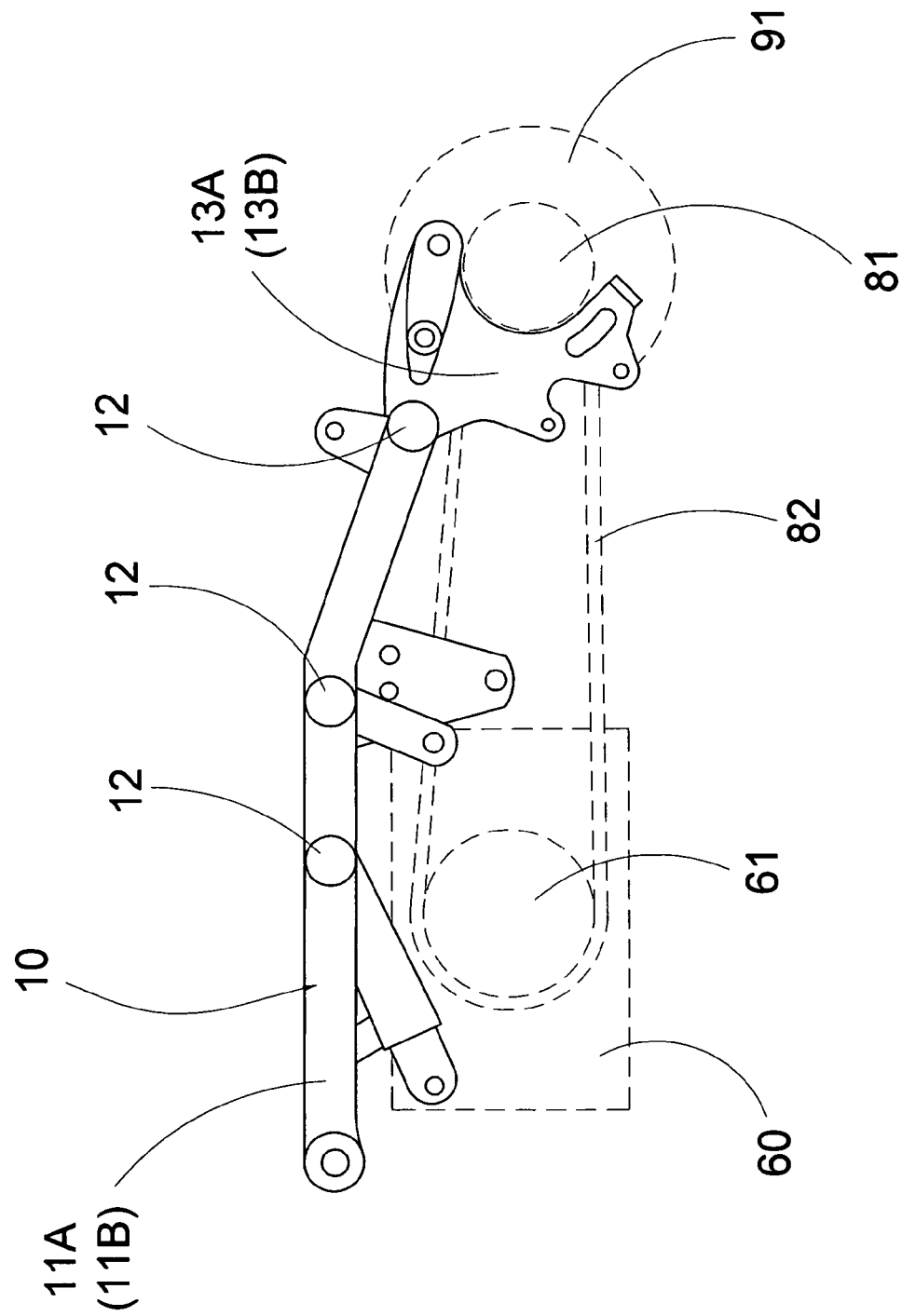
FIG. 4 is an explosive view of the suspension device of the transmission and suspension system according to the above preferred embodiment of the present invention.

According to the preferred embodiment of the present invention, referring to FIGS. 1A, 1B and 2, the supporting frame 10 extends longitudinally along the central axis of the motorcycle 7. The supporting frame 10 comprises two elongated supporting arms 11A, 11B extending parallelly and downwardly from the seat portion 71 of the construction frame 70 along the central axis of the construction frame 70 symmetrically. The supporting frame 10 also comprises one or more reinforced beams 12 transversely connecting between the two supporting arms 11A, 11B to maintain the shape of the supporting frame 10. Preferably, the beams 12 are fixed on the supporting arms 11A, 11B by welding. With the reinforced beams 12 and the supporting arms 11A, 11B, the supporting frame 10 retains a rigid construction for sustaining the force executed over the motorcycle 7. Referring to FIG. 4, the two supporting arms 11A, 11B are bent downwardly at the rear portion thereof to avoid obstructing the power transmission.

The front ends of the supporting arms 11A, 11B of the supporting frame 10 are pivotally connected below the seat portion 71 of the construction frame 70 of the motorcycle 7, and the rear ends of the supporting arms 11A, 11B of the supporting frame 10 are connected with the axle sleeves 20A, 20B through a pair of brackets 13A, 13B respectively so as to mount and support the pair of axle sleeves 20A, 20B of the axle supporter 20 in a lateral manner coaxially.

Referring to FIGS. 1B and 2, the suspension unit 50 comprises at least a resilient member connected between a position behind the pivotal connection of the supporting arms 11A, 11B of the seat portion 71 of the construction frame 70 and the supporting frame 10 positioned behind the engine 60.

According the preferred embodiment of the present invention, a pair of shock absorbers 50A, 50B is embodied as the resilient members of the suspension unit 50. The upper ends of the two shock absorbers 50A, 50B are pivotally connected to a rear bottom of the seat portion 71 of the construction frame 70 while the lower ends of the two shock absorbers 50A, 50B are pivotally connected to the rear reinforced beam 12 located closest to the transmission cavity 21 of the supporting frame 10. The two shock absorbers 50A, 50B are arranged to support the seat portion 71 of the construction frame 70 and absorb shock received when driving the motorcycle 7 via the rear wheels 73, 74 and the supporting frame 10.

Since the bottom ends of the shock absorbers 50A, 50B are spaced apart and pivotally affixed on the rear portion of the supporting frame 10 but are not affixed on the rear end of the supporting frame 10 which carries the rear axle 50 of the motorcycle so that the bottom ends of the shock absorbers 50A, 50B are located between the rear wheels 73, 74 and the front wheel 72, the force executed on the shock absorbers 50A, 50B will be transformed and distributed to the whole supporting frame 10 instead of applying to the rear axle 30. Also, moving the shock absorbers 50A, 50B forward will allow a larger rear wheel travel with the same shock absorbers 50A, 50B of the suspension unit 50.

The two axle sleeves 20A, 20B of the axle supporter 20 are adapted to rotatably receive the left axle 31 and the right axle 32 respectively in a coaxial manner. The inner ends of the pair of axle sleeves 20A, 20B are mechanically affixed to the rear ends of the supporting arms 11A, 11B of the supporting frame 10 respectively in an end-to-end manner while the outer ends of the pair of axle sleeves 20A, 20B are extending coaxially outwards to the left and right sides of the motorcycle 7.

Figure 3:
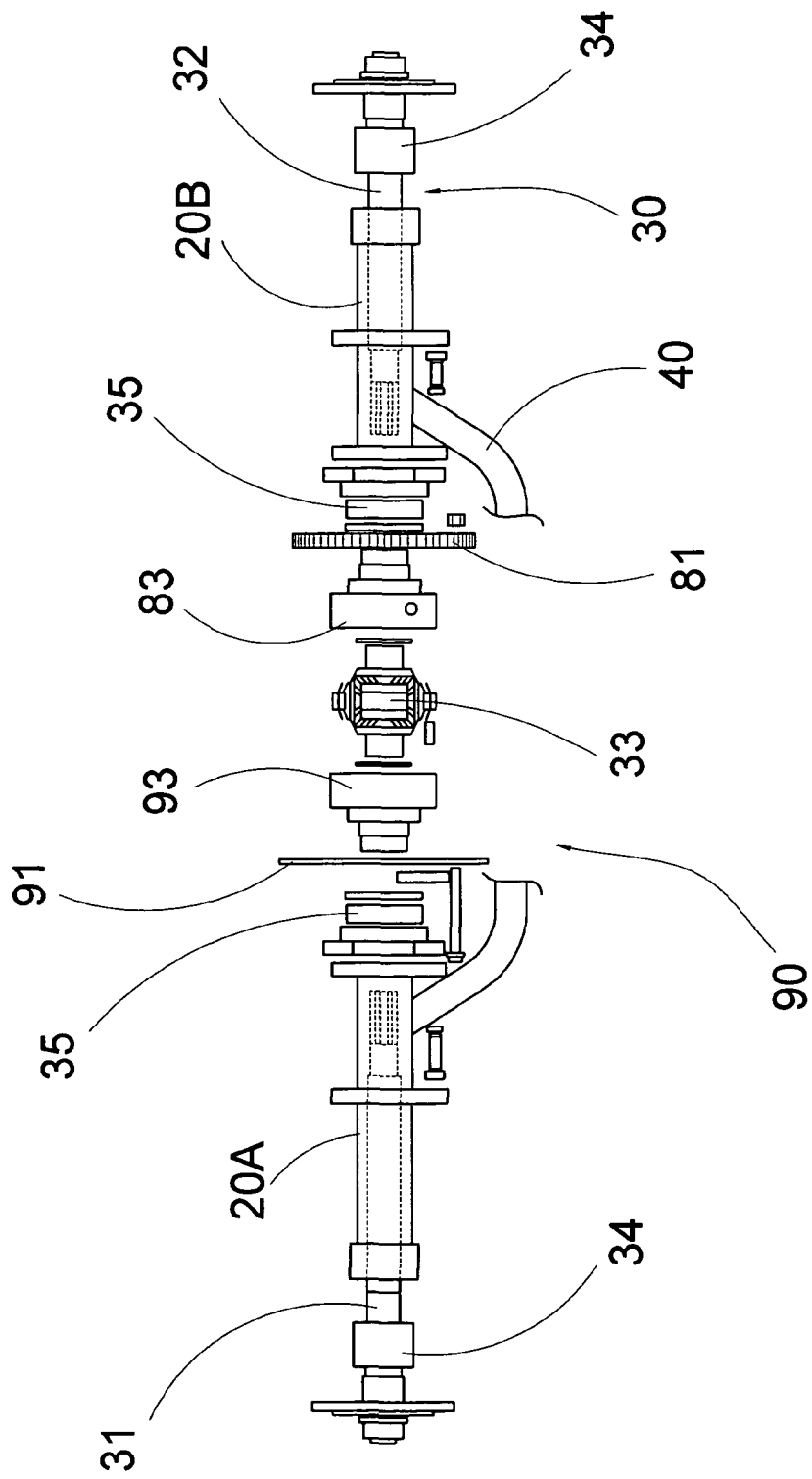
FIG. 3 is a side view of the transmission device of the motorcycle rear-wheels transmission and suspension system according to the above preferred embodiment of the present invention.

The two axle sleeves 20A, 20B are aligned coaxially and arranged generally to be perpendicular to the central axis. The left and right axles 31, 32 are rotatably disposed within the two axle sleeves 20A, 20B respectively with two opposite ends thereof extending through the two outer ends of the two axle sleeves 20A, 20B, as shown in FIGS. 1B, 2 and 3. The two rear wheels 73, 74 are mounted on the two opposite ends of the left and right axles 31, 32 respectively such that the two axle sleeves 20A, 20B support the left and right axles 31, 32 with the rear wheels 73, 73 to rotate.

Referring to FIGS. 1B and 2, a central section of the rear axle 30 between the left and right axles 31, 32 is located in the transmission cavity 21 and the transmission device 3 of the present invention is installed with the central section of section of the rear axle 30 within this transmission cavity 21.

According to the preferred embodiment as illustrated in FIG. 3, the left and right axles 31, 32 of the rear axle 30 are symmetrically aligned within the axle sleeves 20A, 20B. The left axle 31 is coupled with the left rear wheel 73 and the right axle 32 is coupled with the right rear wheel 74. The rear axle 30 further comprises a differential gear unit 33 to operationally connect the left and right axles 31, 32 in the central section of the rear axle 30. Outer bearings 34 are provided at two outer ends of the two axle sleeves 20A, 20B to rotatably support of the left and right axles 31, 32 respectively. Similarly, at the inner ends of rear axles 31, 32, inner bearings 35 are provided at two inner ends of the axle sleeves 20A, 20B to rotatably support the left and right rear axles 31, 32 respectively.

According to the preferred embodiment, as shown in FIG. 3, the two axle sleeves 20A, 20B cover most portion of the left and right axle 31, 32 of the rear axle 30 and carry the rear axle 30 with two bearings on each side. As a result, during driving, the axle sleeves 20A, 20B can prevent sands or stones of the environment from directly contacting the covered portion of the rear axle 30 and the force executed on the left and right axles 31, 32 is distributed over the whole rear axle 30 instead of exerting on one point so as to avoid unexpected damage to the rear axle 30. In other words, the rear axle 30 is strengthened and protected by the axle sleeves 20A, 20B.

In the preferred embodiment of the present invention, referring to FIGS. 1B, 2, 3 and 4, the transmission device 3 further comprises a chain drive 80 which comprises a sprocket gear 81 and a drive chain 82 to drive the rear wheels 73, 74 via the rear axle 30. The sprocket gear 81 is coaxially affixed with the central section of the rear axle 30. One end of the drive chain 82 is coupled with the sprocket gear 81, and the other end of the drive chain 82 is coupled with the output 61 of the engine 60 to transmit the output power of the engine 60 to the rear axle 30 for rotating. It is apparent that other types of transmitting mechanism are also available besides chain drive 80 alternatively.

In the preferred embodiment, the transmission device 3 further comprises a brake unit 90 at the central section of the rear axle 30, which comprises a brake disk 91 and a brake caliper 92. The brake disk 91 of the braking unit 90 is coaxially affixed with the central section of rear axle 30 adjacent to the sprocket gear 81. The brake caliper 92 is affixed on one inner end of one of the axle sleeves 20A, 20B to controllably couple with the brake disk 91 so as to reduce the rotational speed of the rear axle when the brake caliper 92 is engaged with the brake disk 91.

In the preferred embodiment, the brake unit 90 also comprises a brake seat 93 to mechanically connect the brake disk 91 with an inner end of the left axle 31. The chain drive 80 also comprises a gear seat 83 to mechanically connect the sprocket gear 81 with the right axle 32 at the inner end thereof. Both the brake seat 93 and the gear seat 83 are aligned and coupled together to provide a space to receive and cover the differential gear unit 33. Therefore the whole structure of the rear axle is covered and protected.

It is worth mentioning that the space between the two inner ends of the two axle sleeves 20A, 20B forms and defines the transmission cavity 21. The central section of the rear axle 30, the differential gear unit 33, the sprocket gear 81 and the brake disk 91 of the transmission device 30 are all disposed within this transmission cavity 21. Therefore, the weight of the differential gear unit 33, the chain drive 80 and the braking unit 90 of the transmission device 3 is arranged to be loaded at the central axis of the construction frame 70 for better balance of the motorcycle 7 and supported by the supporting frame 10 for better transmission that the drive chain 82 is able to be coupled with the sprocket gear 81 and the brake caliper 92 is able to be coupled with the brake disk 91 in a compact arrangement.

In the preferred embodiment, the two brackets 13A, 13B of the supporting frame 10 are extruding downwardly from the rear ends of the supporting arms 11A, 11B. The two brackets 13*a*, 13*b* are also mechanically connected with the inner ends of the axle sleeves 20A, 20B. Also, the engine 60 is suspended beneath the supporting frame 10. Therefore, the reinforced beams 12 of the supporting frame 10 are extended over the drive drain 82 and won't obstruct the operation of the drive chain 82.

According to the preferred embodiment of the present invention, as shown in FIGS. 1B and 2, the reinforced frame 40 is constructed to enhance a structural strength of each of the axle sleeves 20A, 20B to withstand a torque from the rear axle 30 and provide a protection portion extending rearwardly from the axle sleeves 20A, 20B to form a guard of the transmission cavity 21. In the preferred embodiment of the present invention, the reinforced frame 40 is embodied as a U-shaped reinforced arm. The two ends of the reinforced frame 40 are mechanically affixed to the two axle sleeves 20A, 20B respectively. Preferably, the ends of the reinforced frame 40 are welded to the axle sleeves 20A, 20B to form an integral structure.

Referring to FIG. 2, in order to reinforce the connection, the reinforced frame 40 may further comprise two angle irons 41. Each angle iron 41 is welded with one axle sleeve 20A or 20B and one end of the reinforced frame 40 so that the structure and disposition of the two axle sleeves 20A, 20B are reinforced.

As mentioned above, the reinforced frame 40 connects the two axle sleeves 20A, 20B and crosses over the transmission cavity between the two inner ends of the axle sleeves 20A, 20B. Because the reinforced frame 40 is in a U-shape, it defines the transmission cavity 21 between the bottom of the U-shaped reinforced arm and the rear axle 30. Therefore the reinforced frame 40 won't obstruct the performance of the brake unit 90 and the chain drive 80. It is preferred that the bottom of the U-shaped reinforced arm 40 extrudes rear and downwardly so that the reinforced frame 40 can protect the brake unit 90 and the chain drive 80 as well as the central section of the rear axle 30 by embracing them therewithin.

Alternatively, the reinforced frame 40 can also be in other shapes such as hemisphere, or rectangular. Alternatively, the transmission device 3 can comprises two brake units coupled with the rear axle 30 at the two opposite ends thereof, or coupled with the two rear wheels 73, 74. It is worth mentioning that the transmission device 3 of the motorcycle 7 of the present invention may also provide with a reverse gear unit 36 for selectively driving the motorcycle 7 to move in a reverse direction by driving the rear wheels 73, 74 to rotate in a reverse direction.

In view of above, the motorcycle rear-wheels transmission and suspension system of the present invention can be constructed in a motorcycle to form a motor tricycle with a simple, reliable and durable structure in relatively lower cost than the conventional motor tricycle and ATV while providing the performances of stable and easy to ride. However, the motorcycle rear-wheels transmission and suspension system of the present invention is good for use of modifying a two-wheeled motorcycle into a motorcycle containing two rear wheels such that the conventional motor bicycle can achieve the performance such as better stability like a motor tricycle. Such modification is convenient, effort saving and cost reducing because that the motorcycle rear-wheels transmission and suspension system is constructed at a central position to minimize and simplify the construction thereof while providing stable weight balance and support of the motorcycle. In addition, the engine output of the motor bicycle can be directly connected to the transmission device for driving the two rear wheels to rotate while well supporting the transmission device and the two rear wheels by the suspension device and the original construction frame of the motor bicycle.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A frame structure for a motorcycle comprising a construction frame to mount and support an engine, a suspension unit, a transmission device, one front wheel and two rear wheels, wherein said frame structure comprises:

a supporting frame adapted for longitudinally extending along a central axis of said construction frame and for connecting with said construction frame at a position that said suspension unit provided between said supporting frame and said construction frame for absorbing shock;

an axle supporter transversely provided at a rear end of said supporting frame, wherein a transmission cavity is defined at said rear end of said supporting frame and at a central position thereof behind an output of said engine along said central axis of said construction frame; and a rear axle rotatably and transversely supported by said axle supporter for connecting with said two rear wheels at two outer ends thereof, wherein a transmission cavity is arranged for supporting said transmission device therein to transmit a rotation output from said engine to drive said rear axle to rotate so as to driving said rear wheels to rotate.

2. The frame structure, as recited in claim 1, wherein said axle supporter comprises two axle sleeves coaxially aligned and transversely affixed at said rear end of said supporting frame, wherein said rear axle is extended through said axle sleeves for connecting with said two rear wheels.

3. The frame structure, as recited in claim 2, wherein said transmission cavity is formed between inner ends of said axle sleeves.

4. The frame structure, as recited in claim 1, wherein said rear axle comprises a left axle and a right axle for connecting with said two rear wheels respectively, wherein said left and right axles are supported by said axle supporter and are coaxially aligned with each other.

5. The frame structure, as recited in claim 3, wherein said rear axle comprises a left axle and a right axle for connecting with said two rear wheels respectively, wherein said left and right axles are supported by said axle supporter and are coaxially aligned with each other.

6. The frame structure, as recited in claim 5, wherein said left and right axles which are carried and extended transversely through said axle sleeves respectively so that said left axle and said right axle are rotatably supported for driving said two rear wheels to rotate respectively.

7. The frame structure, as recited in claim 1, further comprising a reinforced frame provided at a central portion of said axle supporter not only to enhance a strength of said axle supporter for withstanding a torque from said rear axle but also to define said transmission cavity therewithin for forming a guard of said transmission cavity.

8. The frame structure, as recited in claim 2, further comprising a reinforced frame provided at a central portion of said axle supporter not only to enhance a strength of said axle supporter for withstanding a torque from said rear axle but also to define said transmission cavity therewithin for forming a guard of said transmission cavity.

9. The frame structure, as recited in claim 6, further comprising a reinforced frame provided at a central portion of said axle supporter not only to enhance a strength of said axle supporter for withstanding a torque from said rear axle but also to define said transmission cavity therewithin for forming a guard of said transmission cavity.

10. The frame structure, as recited in claim 8, wherein said reinforced frame crosses over said two axle sleeves to support and retain an alignment of said axle sleeves and define said transmission cavity between said two axle sleeves and said reinforced frame at said central position that is directly behind said output of said engine along said central axis of said construction frame.

11. The frame structure, as recited in claim 9, wherein said reinforced frame crosses over said two axle sleeves to support and retain an alignment of said axle sleeves and define said transmission cavity between said two axle sleeves and said reinforced frame at said central position that is directly behind said output of said engine along said central axis of said construction frame.

12. The frame structure, as recited in claim 8, wherein said reinforced frame is a U-shaped reinforced arm having two ends affixed to said two axle sleeves of said axle supporter respectively so as to define said transmission cavity between said U-shaped reinforced arm and said two axle sleeves.

13. The frame structure, as recited in claim 11, wherein said reinforced frame is a U-shaped reinforced arm having two ends affixed to said two axle sleeves of said axle supporter respectively so as to define said transmission cavity between said U-shaped reinforced arm and said two axle sleeves.

14. The frame structure, as recited in claim 1, wherein said supporting frame comprises a pair of elongated supporting arms arranged for extending parallelly and downwardly from a seat portion of said construction frame along said central axis of said construction frame symmetrically, and one or more reinforced beams transversely connecting between said two supporting arms to form a rigid construction for sustaining any force executed over said motorcycle.

15. The frame structure, as recited in claim 6, wherein said supporting frame comprises a pair of elongated supporting arms arranged for extending parallelly and downwardly from a seat portion of said construction frame along said central axis of said construction frame symmetrically, and one or more reinforced beams transversely connecting between said two supporting arms to form a rigid construction for sustaining any force executed over said motorcycle.

16. The frame structure, as recited in claim 13, wherein said supporting frame comprises a pair of elongated supporting arms arranged for extending parallelly and downwardly from a seat portion of said construction frame along said central axis of said construction frame symmetrically, and one or more reinforced beams transversely connecting between said two supporting arms to form a rigid construction for sustaining any force executed over said motorcycle.

17. The frame structure, as recited in claim 15, wherein front ends of said supporting arms are pivotally connected below said seat portion of said construction frame and rear ends of said supporting arms are connected with said axle supporter.

18. The frame structure, as recited in claim 16, wherein front ends of said supporting arms are pivotally connected below said seat portion of said construction frame and rear ends of said supporting arms are connected with said axle supporter.

19. The frame structure, as recited in claim 17, further comprising two brackets extruding downwardly from said rear ends of the supporting arms and connected with said inner ends of said axle sleeves respectively.

20. The frame structure, as recited in claim 18, further comprising two brackets extruding downwardly from said rear ends of the supporting arms and connected with said inner ends of said axle sleeves respectively.

* * * * *